VAN HORN & ALEXANDER.

Machine for Sheeting Plug Tobacco.

No. 2,044.

Reissued Aug. 1, 1865.

Witnesses.

Chas. Pier

T. A. Henry

Inventors.

Watter J. Van Horn

William Alexander

N. PETERS. Photo-Lithographer, Washington, D. C.

UNITED STATES PATENT OFFICE.

W. J. VAN HORN AND WM. ALEXANDER, OF LOUISIANA, MISSOURI.

MACHINE FOR SHEETING PLUG-TOBACCO.

Specification forming part of Letters Patent No. 25,652, dated December 27, 1859; Reissue No. 2,044, dated August 1, 1865.

*To all whom it may concern:*

Be it known that we, WALTER J. VAN HORN and WILLIAM ALEXANDER, of Louisiana, in the county of Pike and State of Missouri, have invented certain new and useful Improvements in Machines for Manufacturing Plug Chewing-Tobacco; and we do hereby declare that the following is a full, clear, and exact description of the same, reference being had to the accompanying drawings and the letters and figures marked thereon, which form part of this specification.

The nature of our said invention consists in a novel arrangement of pressing rollers and belts, whereby the tobacco-leaves on being fed into the machine are firmly and compactly pressed into a continuous sheet of the proper thickness; and, also, in a novel arrangement of rollers and cutting-knives, whereby the aforesaid continuous sheet of tobacco is cut up into lumps or plugs of any desired size.

To enable those skilled in the art to understand how to construct and make use of our invention, we will proceed to describe the same with particularity, making reference in so doing to the aforesaid drawings, in which—

Figure 1:
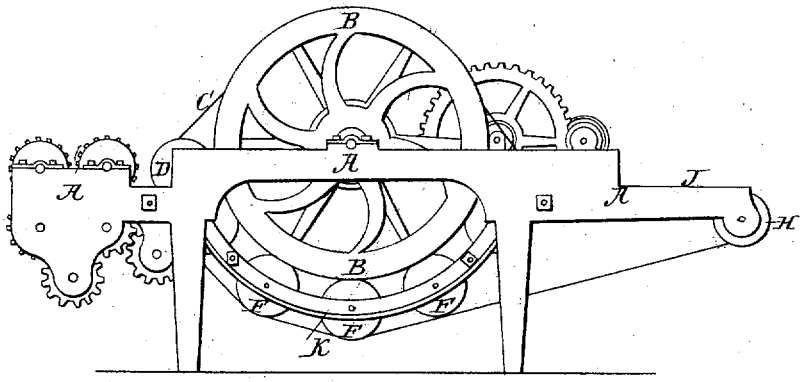
Figure 3:
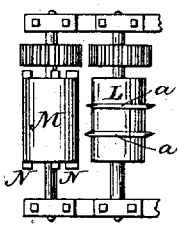
Figure 2:
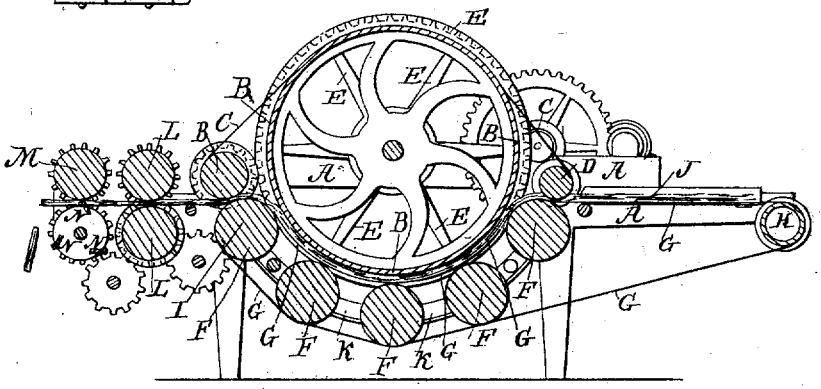

Figure 1 represents a side elevation of our invention; Fig. 2, a longitudinal central section taken through Fig. 1; and Fig. 3 is a detailed view of the cutters for cutting the tobacco into strips and plugs as it issues from the pressing apparatus.

The same letters of reference in the several figures denote the same parts of our invention.

A represents the cast-iron frame which supports the operating parts of the machine.

B is a large cylinder provided with flanges projecting outward at each end and supported in suitable bearings upon the frame A. A broad belt, C, of suitable width for the purposes hereinafter mentioned, which may be of sheet metal or some other strong, heavy material, passes around the said cylinder B, and also around the two rollers D D, as shown, which are also provided with flanges.

Upon one side of the cylinder B and fixed upon its shaft is a spur-wheel, E, of the same diameter as the cylinder, which is revolved in any suitable manner by steam-power or otherwise, and communicates its motion by means of suitable gearing to the pressing-rollers and cutting apparatus.

The pressing-rollers (marked F) are arranged beneath the cylinder B, as shown, and between its aforesaid flanges, and are each provided with a spur wheel or pinion which engages with the cogs upon E, from which they all receive a rotary motion. These pressing-rollers F have the bearings in the arc K, which forms part of the frame A.

G represents an endless belt of the same width and material as the belt C, which passes along upon the pressing-rollers F between them and the belt C, beneath said rollers F, around the roller H at the extreme end of the table J, and upon said table, as shown.

At the rear end of the machine, or where the sheet of tobacco issues from the pressing apparatus, are arranged the cutting-rollers, four in number, L L representing the rollers for cutting the sheet of tobacco into continuous strips whose width equals the desired width of the plugs, which is effected by means of circular knives or cutters *a*, arranged at suitable distances apart upon the lower of said rollers L L, the upper roller having corresponding grooves in its surface, into which the said knives enter, and thus insure the perfect cutting of the tobacco, as aforesaid. After passing through these rollers the tobacco passes on between the rollers M M, which are provided with the properly-arranged knives for cutting the continuous strips aforesaid into plugs. To effect this result the lower roller M is provided with a series of knives arranged longitudinally with respect to said roller, and projecting out from the surface thereof sufficient to accomplish the desired result. The said knives are marked N, and are arranged at such a distance apart as to cut the continuous strips into plugs of the desired length.

If preferred, the two sets of cutters may be arranged upon one pair of rollers, instead of two, although the operation of the device is more perfect when two pairs of cutting-rollers are used. The said cutting-rollers are all operated by spur-gearing, as indicated, the motion being communicated thereto by the main wheel E.

The leaves of the tobacco, properly moistened, and prepared, are arranged upon the table J in a layer of the proper thickness, and are drawn in between the revolving cylinder B and the rollers F, and also between the belts C and G by the action of the said belt G, and, being submitted to the requisite amount of pressure to consolidate and compress the same into a solid mass or sheet, it passes out from between said belts in a sheet or layer of the proper thickness and compactness for plug-tobacco. The said sheet then passes on between the rollers L L, when the said circular knives *a* cut the sheet into continuous strips of such a width as to be equal to the width of the plugs, which strips then pass on between the rollers M, when the knives N cut said strips into plugs.

In practice, if the machine should be choked or clogged up by the adhering of the tobacco to the bands or belts, they may be kept clean by arranging suitable scrapers coming in contact with the bands as they pass from or between the rollers.

We will now specify what we claim and desire to secure by Letters Patent—

1. The combination and arrangement of the two belts C and G, or their equivalents, with a cylinder, B, and a series of pressing-rollers, F, arranged and operating substantially as and for the purposes herein specified and shown.

2. In combination with said cylinder, pressing-rollers, and belts C G, the employment of the feeding-table J, all arranged and operating substantially as shown and described.

3. The employment of the rollers L L, provided with the circular knives *a* and the corresponding channels or grooves, substantially as and for the purposes delineated and described.

4. The employment of the rollers M M, provided with the longitudinal cutters N, arranged and operating as and for the purposes set forth.

5. The combination and arrangement of the two pairs of rollers L and M, provided, respectively, with the cutters *a* and N, arranged and operating substantially as and for the purposes herein set forth and shown.

6. The combination and arrangement of the cylinder B, rollers F, table J, belts C G, and cutting-rollers L and M, constructed and operating substantially as and for the purposes herein specified and described.

WALTER J. VAN HORN.
WILLIAM ALEXANDER.

Witnesses for Walter J. Van Horn:
W. E. MARRS,
L. L. COBURN.
Witnesses for William Alexander:
B. F. HESSER,
R. M. WEIR.